(12) United States Patent
Uriarte

(10) Patent No.: US 11,834,281 B2
(45) Date of Patent: Dec. 5, 2023

(54) METHOD FOR AUTOMATED REPALLETIZING OF PACKAGED GOODS

(71) Applicant: CELLUMATION GMBH, Bremen (DE)

(72) Inventor: Claudio Uriarte, Bremen (DE)

(73) Assignee: CELLUMATION GMBH, Bremen (DE)

( * ) Notice: Subject to any disclaimer, the term of this patent is extended or adjusted under 35 U.S.C. 154(b) by 381 days.

(21) Appl. No.: 17/095,966

(22) Filed: Nov. 12, 2020

(65) Prior Publication Data

US 2021/0139259 A1 May 13, 2021

(30) Foreign Application Priority Data

Nov. 12, 2019 (LU) .................................. LU101481

(51) Int. Cl.

| G06F 7/00 | (2006.01) |
|---|---|
| B65G 61/00 | (2006.01) |
| G05B 19/4155 | (2006.01) |
| G06Q 50/28 | (2012.01) |
| B65G 13/00 | (2006.01) |

(52) U.S. Cl.
CPC ......... B65G 61/00 (2013.01); G05B 19/4155 (2013.01); G06Q 50/28 (2013.01);
(Continued)

(58) Field of Classification Search
CPC .... B65G 61/00; B65G 13/00; B65G 2207/34; B65G 57/03; B65G 2201/025;
(Continued)

(56) References Cited

U.S. PATENT DOCUMENTS 2,508,861 A * 5/1950 Jessen .................... B65G 25/08
414/796
3,645,379 A 2/1972 Kornylak
(Continued)

FOREIGN PATENT DOCUMENTS

| CN | 1117928 | 3/1996 |
|---|---|---|
| DE | 102009026388 | 2/2011 |

(Continued)

*Primary Examiner* — Yolanda R Cumbess
(74) *Attorney, Agent, or Firm* — Sheridan Ross P.C.

(57) ABSTRACT

The invention relates to a method for automated repalletizing of packaged goods, the method to be carried out with a conveyor table with devices for the omnidirectional movement of packaged goods from an original layer, formed by units of packaged goods to be reconfigured, to a target layer, formed by units of packaged goods, wherein the conveyor table has an area that is larger than the area that is occupied by an original layer of the units of packaged goods to be configured, having the following steps:
  providing an original layer of units of packaged goods on the conveyor table,
  automated separation of the units of packaged goods by the conveyor table such that maneuvering distances are created between at least two of the units of packaged goods,
  moving the units of packaged goods to a predetermined position of the target layer, and
  optionally completing and optionally compressing the target layer of units of packaged goods,
wherein at least more than one of the units of packaged goods of the target layer are on the conveyor table during the entire process, as well as a programmed data processing device for controlling a method and a data carrier or data sequence having control instructions for programming such data processing devices.

11 Claims, 4 Drawing Sheets

(52) U.S. Cl.
CPC .......... *B65G 13/00* (2013.01); *B65G 2207/34* (2013.01); *G05B 2219/31042* (2013.01)

(58) Field of Classification Search
CPC ........ B65G 60/00; B65G 57/24; B65G 57/20; B65G 2203/02; G05B 19/4155; G05B 2219/31042; G06Q 50/28
USPC .......................................... 700/213, 217, 228
See application file for complete search history.

(56) References Cited

U.S. PATENT DOCUMENTS

| | | | | |
|---|---|---|---|---|
| 4,019,620 | A * | 4/1977 | Frenkel ................ | B65G 47/681 198/399 |
| 2007/0280814 | A1 | 12/2007 | Morency et al. | |
| 2008/0260513 | A1 * | 10/2008 | Lalesse .................. | B65G 57/26 414/792.6 |
| 2009/0229953 | A1 * | 9/2009 | Pressler ................ | B65G 17/24 198/779 |
| 2013/0037388 | A1 * | 2/2013 | Faist .................... | B65G 1/0478 198/783 |

FOREIGN PATENT DOCUMENTS

| | | |
|---|---|---|
| DE | 102010044239 | 10/2011 |
| EP | 0276881 | 3/1992 |
| EP | 2874923 | 4/2017 |
| GB | 2348631 | 10/2000 |

\* cited by examiner

METHOD FOR AUTOMATED REPALLETIZING OF PACKAGED GOODS

CROSS-REFERENCE TO RELATED APPLICATIONS

This application claims the benefit of Luxemburg Patent Application No. LU101481 filed 12 Nov. 2019, the entire contents of which is incorporated herein by reference in its entirety.

The invention relates to a method for automated repalletizing of packaged goods.

BACKGROUND OF THE INVENTION

Sorting, assembling and reconfiguring packaged goods plays an important role in the logistics of goods and material flows. Increasing automation requires ever quicker and more accurate processes.

In one aspect of goods and material transport, objects are stacked in layers in various logistical processes or production processes, in particular for storage, commissioning or space-saving transport. In some processes, however, a prior arrangement of the objects with respect to one another on the layer must be changed. This involves changing the pattern of the original layer in a target pattern. The newly produced layer pattern can differ in number, size and geometry from the original pattern. This process is referred to as reconfiguration or repalletizing of a layer. Such reconfiguration of layers occurs frequently in logistics, for example when repalletizing pallets or loading trays in storage processes. Although the term repalletizing is used in the strictest sense of the word to describe the (generally fully-automated) movement of the goods (as a whole) from one pallet to another, it is also often understood as reconfiguration (it is also possible to refer to repacking in layers) as described above. This expanded meaning is used here and in the following.

The optimized automated palletizing or depalletizing of boxes, crates, cases, bags, wheels, buckets, panels, trays and other products requires an optimal interaction of many factors. The main focus is on an optimized interaction of palletizing robot systems, gripper systems, conveyor systems and the corresponding palletizing software.

In this context, many different solutions are known. The majority are based on a combination of robot grippers and conveyor systems.

There are therefore, for example, systems that transfer the load of a whole pallet onto a differently dimensioned pallet or a pallet made of a different material without removing the individual units of packaged goods. In this type of repalletizing, only the "carrier" is replaced, meaning there is a so-called pallet replacement. The arrangements of the layers with respect to one another and the layer pattern are not changed in this case. This can be achieved by lifting the palletized goods from the pallet and subsequently changing the pallet, as described for example in EP2349886B1. Alternatively, the goods can be moved from one pallet onto the other.

Another option is turning the pallet. This involves clamping the palletized goods, usually together with the original pallet, lifting and rotating them and then placing them upside down onto a target pallet. The original pallet, which now lies on top of the goods, can be removed. When turning pallets, the goods change their orientation and are upside down once the pallet has been changed. The layer pattern is not changed in this case. If the goods are to maintain the original orientation, a second turning operation must be performed.

All versions of pallet replacement are characterized by the fact that the pallet can be exchanged quickly. However, they have the disadvantage that they can only be used if the target pallet has at least the same dimensions as the original pallet. If the target pallet is smaller than the original pallet, the method cannot be used. If the target pallet has a larger base than the original pallet, the area of the target pallet is not fully used. This results in losses of area as part of the area of the target pallet is not used. For example, repalletizing a completely loaded EUR-pallet to an Australian pallet leaves approx. 30% of the area unused.

Manually repalletizing the goods is another repalletizing option. This involves gradually removing the goods by hand from the original pallet and placing them onto a target pallet. The lifting and moving can be performed using muscle power alone or using work equipment, such as vacuum-powered lifting systems. One advantage of manual repalletizing is that the layer pattern of the target pallet can be different from the layer pattern of the original pallet. By changing the layer pattern, the area of the target pallet can be optimally used. However, the method is very slow, labour-intensive and physically demanding for the workers. Without the use of work equipment, the work is very burdensome especially in terms of ergonomics.

For this reason, the trend is increasingly moving towards automation of the task of repalletizing or reconfiguration. In the previously known versions, the goods are generally removed from the original pallet (depalletizing) and subsequently loaded onto the target pallet (palletizing) using handling systems or robots. Automatic repalletizing is performed in various ways.

A repalletizer is known that consists of a depalletizing system and a palletizing system that are connected by means of conveyor technology. During repalletizing, the top layer of the original pallet is removed row by row and separated. The goods are guided individually and one after the other to the palletizing system via a roller conveyor "in single file". The goods are transferred to the palletizing system, where the layers are generated in rows and placed on the target pallet. This system has the advantage that the area of the target pallet can be optimally used as the layer pattern can be freely configured. If the layer pattern of the original pallet is suitable, repalletizing can be done quickly. The disadvantage lies in the large area required and the high costs of the system. If the layer pattern of the original pallet is irregular, repalletizing can also be very time-consuming and require additional components.

A further approach of automated repalletizing consists of an industrial robot, which removes individual objects from the original pallet and places them directly on a target pallet. Several target pallets can also be used from a single original pallet. In this case, the system is expanded by a linear guide of the robot. The system is very space-efficient as the goods are placed on the target pallet straight away after unloading without having to be temporarily stored. However, as a result of the single grip and individual handling, repalletizing is very time-consuming. In one variation of this approach, the robot removes the objects individually and places them on a buffer area. The objects are then transported to a removal place and picked up by the robot, in turn individually or also together, and placed on the target pallet.

US patent application US2007280814 discloses a system for producing mixed-case layers from single-case layers. The process consists of depalletizing, separating the packages, storing the packages in buffer areas, forming a new layer, and then palletizing. The system is thus a repalletizing system within the meaning of the invention. The device consists of a plurality of conveyor sections for the infeed of single-product original pallets, an industrial robot for producing the new layers and a roller ball table with non-driven balls, on which the products are moved individually by the robot during the creation of the layers. The roller ball table can be considered a non-driven omnidirectional surface. However, it is not a conveying surface as it is not able to actively move the objects by itself.

In terms of the conveyor systems used, the roller conveyors and so-called matrix conveyors that are used to move the units of packaged goods in a targeted manner should also be mentioned in particular.

Based on this situation, it is the object of the invention to provide a method for automated repalletizing of packaged goods, which enables repalletizing to be carried out in less time, enables a variable reconfiguration of the goods and at the same time requires less space.

The object is achieved by means of a method according to claim 1. Further advantageous embodiments are in particular the subject of the dependent claims.

The invention relates to a method for automated repalletizing of packaged goods, wherein the method is to be carried out with a conveyor table with devices for the omnidirectional movement of packaged goods from an original layer, formed by units of packaged goods to be reconfigured, to a target layer, formed by units of packaged goods, wherein the conveyor table has an area that is larger than the area that is occupied by an original layer of the units of packaged goods to be configured, wherein the method has the following steps:

providing an original layer of units of packaged goods on the conveyor table, automated separation of the units of packaged goods by the conveyor table such that maneuvering distances are created between at least two of the units of packaged goods, moving the units of packaged goods to a predetermined position of the target layer, and optionally completing and optionally compressing the target layer of units of packaged goods.

According to the invention, at least more than one of the units of packaged goods of the target layer are on the conveyor table during the entire process.

The term packaged goods or units of packaged goods should be understood here and in the following in particular as any type of packaged product or product to be packaged. This not only includes packages, whether in a box or not, but also all types of packable goods that can be transported, i.e. moved, individually or in packs.

The term original layer is understood within the meaning of the present invention as an arrangement or configuration of a plurality of units of packaged goods. The arrangement or configuration of a plurality of units of packaged goods can, for example, comprise two, three, four, five, six, seven, eight, nine, ten, eleven, twelve or more units of packaged goods. It forms an arrangement, which—with the conventional deviations—is stored or can be stored on the original pallet or on an original feed device on one level. This arrangement can be moved jointly, i.e. not just individually, with the suitable means.

Within the meaning of the present invention, the term automated repalletizing of packaged goods means in particular that the units of packaged goods of an original layer of a pallet or of another holding or storing device are moved to a target layer with a modified configuration. The target configuration, or in other words target arrangement or target structure, of the units of packaged goods is determined, for example, by another dimensioning of a target pallet or holding/storing device of the target. In this case, the target configuration can comprise all or only part of the units of packaged goods of the original layer. It is therefore possible for the target layer to have as many units of packaged goods as the original layer or less or more. Similarly this also includes the target layer only comprising one part of the units of packaged goods of the original layer, but in addition units of packaged goods of one or a plurality of further original layer(s). This also expressly includes in the present case the target layer comprising units of packaged goods from different original layers, in order to form layers with units having different properties (size, weight, colour, contents etc.).

Repalletizing may be carried out or necessary for a variety of reasons. Various pallets with different formats are used depending on the intended use, region, customer requirements etc. Widely used pallets include so-called standard or EUR-pallets (800 mm×1200 mm), industrial pallets (1000 mm×1200 mm), North American pallets (1016 mm×1219 mm) and Australian pallets (1165 mm×1165 mm). Many companies use a plurality of these pallet formats simultaneously, meaning that the goods often have to be repalletized from one pallet to another.

In other cases, various products have to be stored and transported on a pallet. They can be arranged in "display pallets" or "rainbow pallets" when the products are arranged in columns according to type, in layers when the products are stacked one on top of the other in layers of one type, in "mixed case pallets" when the products are stacked in mixed layers, or in "true mixed case pallets" when the arrangement of the products on the pallet is freely selectable.

A further case of repalletizing within the meaning of the present invention results, for example, from trays being used in a system for storage and intermediate storage of products. The goods are unloaded from a pallet and several are placed on a tray. The goods are then transported and stored in-house on the tray. Here, the original layer of the pallet has to be split into several smaller layers in order to be placed on the tray.

Omnidirectional conveyor tables are conveyor systems that can move objects in a plurality of or all directions on one level. Some examples of such omnidirectional conveyor tables are presented in the following, without this limiting the invention.

U.S. Pat. No. 3,645,379A discloses an omnidirectional conveyor system consisting of omnidirectional wheels, which are mounted on orthogonally arranged shafts and are driven together. The system has a "module" consisting of two orthogonally arranged wheels, which are driven by two drives. The system can move objects in all directions, but cannot rotate them.

Application CN1117928A discloses a further version of the above-mentioned principle. Here, a plurality of omni wheels are driven by a drive in groups. These can be arranged in one other or in matrix form next to one another. It can also be seen here that the wheels are mechanically connected and that one drive therefore drives a plurality of wheels. Rotations are possible here to a limited extent. They can only be performed around pre-defined points, specially where a plurality of modules meet. Non-slip rotation is not possible. Translations and rotations cannot be performed simultaneously with this system.

The system of DE102010044239 A1 works according to a similar principle. In this case, a plurality of omni wheels are mounted on orthogonally arranged shafts and driven together. As in the above-mentioned examples, a plurality of wheels is driven by one drive here. Rotations are not possible in the version from the patent application. By combining several of these modules, a similar system as in the application CN1117928A can be achieved, whereby rotations around pre-defined point become possible. Translations and rotations cannot be performed simultaneously with this system.

Patent application GB2348631A discloses a "driven ball conveyor", a conveyor system consisting of a plurality of freely rotating balls, which are arranged on one level. The balls are arranged in groups and are driven (rotated) together by shafts, which are located below the ball. The shafts are simultaneously intended to support the ball. The shafts are arranged orthogonally with respect to one another and omnidirectional movements can be performed by superimposing the rotation in x and y. Rotation is not possible.

The granted patent EP0276881B1 discloses a further omnidirectional conveyor system consisting of driven balls. Similarly to the above-mentioned example, the balls are driven together. The balls are, however, arranged in groups, and these groups are arranged next to one another such that adjacent groups can travel in different directions and at different speeds. This makes rotation around the intersections of the modules possible. Non-slip rotation is not possible due to the coupling of the movements of the ball.

Patent application DE102009026388A1 discloses a further development of the driven roller ball table. In contrast with the above-mentioned systems, the balls are driven individually here. Rotation around the x and y axes is respectively performed by an electric motor such that each ball has 2 drives. Any desired number of objects can be moved on any path thanks to the single-ball control. Translations and (non-slip) rotations can be performed simultaneously.

The granted patent EP2874923B1 discloses a modular omnidirectional conveyor system consisting of individually driven omni wheels. The modules or cells can be mounted on top of each other in order to create as big a conveyor area as desired. Thanks to the single-wheel drive, objects can be moved on any path independently of one another. Rotations are possible around any point. Translations and rotations are thus possible simultaneously and in a non-slip manner.

All types of the above-mentioned omnidirectional conveyor tables are suitable for being used in the method of the present invention.

In the method according to the invention, the conveyor table has an area that is larger than the area that is occupied by an original layer of the units of packaged goods to be configured. This is advantageous in so far as the automated method especially with regards to a time and space-efficient implementation of the repalletizing or reconfiguration task refers to the fact that no individual units of packaged goods should be loaded individually onto the conveyor table.

In a first step of the method according to the invention, an original layer of units of packaged goods is now provided on the conveyor table. This includes all types of provision, such as manual placement, placement by a robot, by a gripper or else placement by a roller conveyor or a belt. It is also expressly included here that although a plurality of units of packaged goods of an original pallet forms an original layer within the meaning of the invention, the provided units of packaged goods cannot constitute all but rather only a part of a complete level or layer of a pallet.

A next step involves the automated separation of the units of packaged goods by the conveyor table such that maneuvering distances are created between at least two of the units of packaged goods.

After the original layer has been placed onto the conveyor table, the units of packaged goods are moved by targeted movements in other words such that gaps are created between the units. This movement can be sequential based on the individual units of packaged goods or preferably correspond to an "explosion movement". In such an explosion movement, the units of packaged goods, or at least a plurality of the units of packaged goods, are simultaneously moved away from one another. The paths can be calculated by manual input, for example by means of a user interface. Alternatively, the path can be fully automatically calculated by a computerized system. This involves the system calculating the movements of the units of packaged goods from the original layer and to the target layer. The respective layer patterns can be defined manually or automatically.

If a conventional omnidirectional conveyor system without single-wheel drive or control is used, the units of packaged goods can be moved translationally or rotated sequentially, i.e. not simultaneously, rather one after another. If an omnidirectional conveyor system with single-wheel drive or control is used, the units of packaged goods can also be rotated by any number of degrees during the separation movement if required and translationally conveyed at the same time. The condition for rotation is that the gaps between the objects are large enough so that there are no collisions between the objects. When using an omnidirectional conveyor system with single-wheel drive, the units of packaged goods can be moved translationally, rotated or moved in one of the above combined movement types.

In a further step of the method according to the invention, the units of packaged goods are moved to a predetermined position of the target layer. As soon as the units of packaged goods have been separated as set out above in such a way that they have adequate maneuvering distances from one another, they can be moved to their predetermined position of the target layer by means of the conveyor technology of the conveyor table. In this case, the target layer does not have to contain all the units of packaged goods of the original layer. The potentially superfluous units of packaged goods can either remain on the conveyor table or they can be moved to a buffer section. Such a buffer section can be composed, for example, of a table, a belt or a roller conveyor. The layer pattern of the target layer can thus differ from the original layer pattern. A targeted rotation of the objects is also possible during clustering, i.e. whilst the individual units of packaged goods are brought together. Finally, the target layer can be transferred to the target pallet.

The target layer of units of packaged goods can subsequently thus be optionally completed and also optionally compressed. In this case, it is possible, for example, that units of packaged goods from another, further original layer or individual units of packaged goods from a buffer region are also added to the target layer. Provided that there are still distances or gaps between the units of packaged goods, these can preferably be minimized by the conveyor technology of the conveyor table in an automated manner, i.e. the target layer can be compressed, in order to facilitate the removal of the target layer from the conveyor table, for example by a robot, gripper or else by a belt or a roller conveyor.

According to the invention, it is now provided that at least more than one of the units of packaged goods of the target layer are on the conveyor table during the entire process.

In other words, a central idea of the method according to the invention is to leave at least more than one unit of packaged goods of the target layer on the conveyor table during all of the steps of the method.

In contrast to the previously known methods, no buffer or intermediate step is carried out with respect to as many units of packaged goods as possible. In particular, the units of packaged goods are not separated in such a way that they are dispensed individually or one after the other into a roller conveyor or a belt, before they are brought back together from there onto the conveyor table and to the target layer, in turn individually or one after the other.

In this way, the method according to the invention saves a considerable amount of time and reduces the space needed to work in. At the same time, the greatest possible variability is still achieved in terms of the change of the configuration from the original layer to the target layer.

In various embodiments of the method, the number of units of packaged goods of the original layer can thus be different to or the same as the number of units of packaged goods of the target layer.

Even very complex layer patterns can be managed according to the invention. In this case, neither a considerably increased space requirement for the conveyor system is required, nor should a considerable increase in process time be feared.

As already set out above, in the case of superfluous units of packaged goods of the original layer, buffer areas can be provided either on the conveyor table itself or adjacent to the conveyor table. In the case of a shortage of units of packaged goods, a new further original layer can be loaded onto the conveyor table or the units of packaged goods required to complete the target layer can be transported from another source, for example from a roller conveyor, a belt or a table, to their position in the target layer.

In the simplest case, the number of units of packaged goods of the original layer and the target layer is identical and only the configuration or the dimensioning or orientation of the target layer is modified.

In a further simple embodiment of the invention, it is provided that at least one unit of packaged goods is moved exclusively translationally.

In a further embodiment of the invention, it is provided that at least one unit of packaged goods is both moved translationally and rotated.

In this way, a very high performance of the method can be achieved by parallelization of the movement steps. The omnidirectional conveyor technology of the conveyor table necessary for this can be implemented both by means of a plurality of wheels per drive and also preferably by means of such wheels that respectively have their own drive.

The at least one unit of packaged goods can both be moved translationally and rotated simultaneously in sections with a conveyor table where each individual wheel has its own controllable drive.

This increases the efficiency of the method and thus the variability and speed and further reduces the space required of the system as the units of packaged goods can be manoeuvred even in the smallest of spaces.

In a further or additional embodiment of the method, it is provided that at least two units of packaged goods are moved in mutually different translatory directions or in different directions of rotation.

In this way, in contrast to the prior art, it is very quickly possible for the units of packaged goods to maintain the necessary maneuvering distance from the original position in order to be moved in the intended direction to the target position. As the units of packaged goods are moved individually, often only successively or one after the other in the previously known methods, the method according to the invention provides a great gain in speed in terms of this partial aspect too.

In one preferred embodiment of the method according to the invention, it is provided that both the units of packaged goods of the original layer and the units of packaged goods of the target layer are on the conveyor table during the entire process.

In this way, buffering the individual units can be avoided both in terms of space and time. A laborious displacement of the units of packaged goods, for example onto a roller conveyor or a belt, is not required in this embodiment. The conveyor table can perform the repalletizing in accordance with the present method without further aids. This further optimizes the method.

In a further embodiment of the method, the area of the conveyor table can be between 1.2 times and 5.0 times larger than the area that is occupied by an original layer of the units of packaged goods to be configured.

As a lower limit, it is provided in accordance with the invention that the conveyor table has an area that at least corresponds to that of the original layer. In addition, a sufficient area should be selected in order to guarantee the necessary maneuvering distances of the units of packaged goods during movement without collision. Depending on requirements and the intended use, a larger area can, however, also be selected, for example if a plurality of original layers is present simultaneously on the conveyor table in order to produce a mixed target layer. The area of the conveyor table can therefore, for example, be 1.5 times as big as the area of the original layer, approximately 2.8 times as big, approximately 2.0 times as big, approximately 2.5 times as big, approximately 3.0 times as big, approximately 3.5 times as big, approximately 4.0 times as big, approximately 4.5 times as big, or approximately 5.0 times as big as the area that is occupied by an original layer of the units of packaged goods to be configured. Even larger areas can also be selected for special method requirements, for example in the case of very complex target layer patterns with many units of packaged goods coming from different original layers or in the case of units of packaged goods with very different dimensions that are nevertheless on the same original layers.

In a further embodiment of the method according to the present invention, the area of the conveyor table is smaller than the area that is occupied by an original layer and also a target layer of the units of packaged goods to be configured.

In other words, the area of the conveyor table can thus be dimensioned such that only respectively one original layer is put on the table, is then reconfigured according to the invention, and then the resulting target layer is removed before the next original layer is placed onto the table. This means that only an extremely small space is required to carry out repalletizing such that also a plurality of these systems can be set up next to one another at the same time and/or can be operated by a robot for loading and unloading.

The present invention further relates to a programmed data processing device for controlling a method according to the invention.

The data processing device comprises a control system for executing the method according to the invention. For this purpose, the data processing device may have data about the size, weight, dimensions and further parameters or characteristics of the individual units of packaged goods or groups of packaged goods stored in a memory or may receive data from other sources, such as cameras, sensors and scales. In particular, the data processing device may receive data about the start and end position of each unit of packaged goods on the conveyor table or have this data saved in a memory. Based on the input data, the programmed data processing device is able to control a method according to the present invention by sending control commands and control data in particular to the actuators, drives of the omnidirectional wheels, sensors and other technical devices of the conveyor table and monitoring their execution, if necessary.

In further embodiments of the present invention, it is provided that the devices for the omnidirectional movement of packaged goods have wheels, wherein either each wheel can be driven individually or wherein a plurality of wheels can be driven by a common drive.

As already set out above, a high degree of method efficiency can be achieved with such wheels, which can be driven individually or in groups, in the devices for the omnidirectional movement of packaged goods as the units of packaged goods can be both moved translationally and rotated either sequentially or even simultaneously. In this way, the space required for the movements necessary for repalletizing is minimal and, as a consequence, so is the process time if the units of packaged goods do not have to be moved over a large distance.

Furthermore, the present invention relates to a data carrier or data sequence having control instructions for programming data processing devices according to the present invention.

The control instructions can be composed, for example, in all usual computer languages (Java, C++, etc.) and transferred via digital or analogue interfaces to or from the actuators and/or sensors or cameras, scales etc. of the conveyor system.

BRIEF DESCRIPTION OF THE DRAWINGS

The invention is explained in more detail below with reference to the figures. In the figures.

DETAILED DESCRIPTION

The invention will be presented in more detail below with reference to the figure. It should be noted here that different aspects are described that can respectively be used individually or in combination. This means that any aspect can be used with different embodiments of the invention unless explicitly presented as a pure alternative. It should also be noted that the figures may also only represent partial aspects of the present invention.

Furthermore, for the sake of simplicity, reference is usually only made to one entity below. Unless explicitly stated, however, the invention can also respectively have a plurality of the entities concerned. In this respect, the use of the words "a" and "an" should only be understood as an indication that at least one entity is used in a simple embodiment.

Insofar as methods are described below, the individual steps of a method can be arranged and/or combined in any order, unless the context explicitly indicates otherwise. Furthermore, the methods can be combined with one another, unless expressly stated otherwise.

Data with numerical values should not usually be understood as exact values but rather contain a tolerance of +/−1% to +/−10%.

Reference to standards or specifications should be understood as reference to standards or specifications that are/were valid at the time of filing and/or, if a priority is claimed, at the time of the priority application. It should not, however, be understood as a general exclusion of the applicability to subsequent or replacing standards or specifications.

Figure 1:
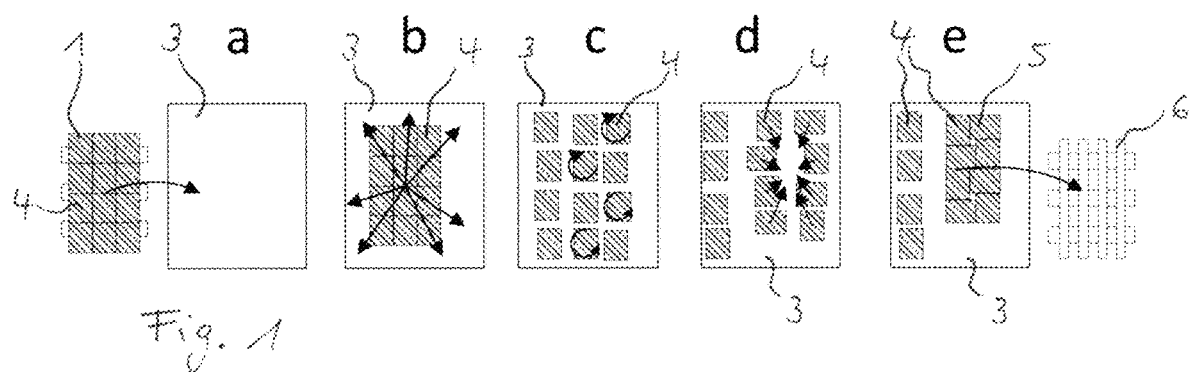
FIG. 1 shows a schematic diagram of successive method steps in one preferred embodiment of the invention.

In FIG. 1, an original layer 1 is first of all represented on an original pallet 2 under the designation a. In the figure, the conveyor table 3 with the devices for the omnidirectional movement of packaged goods is only represented in a highly simplified form as a rectangle. The original layer 2 is formed by units of packaged goods 4 to be reconfigured. The conveyor table 3 has an area that is larger than the area that is occupied by an original layer 1 of the units of packaged goods 4 to be configured. In the step a indicated by the directional arrows, the original layer 2 is prepared on the conveyor table 4. This can be done both manually and (semi-) automatically. In the embodiment shown, the original layer 1 comprises all the units of packaged goods 4 of a layer of the original pallet 2. The number of units of packaged goods 4 of the original layer 1, shown merely be way of example, is 12. In the present embodiment of FIG. 1, the units of packaged goods 4 are equally sized, which does not necessarily have to be the case. In step b of FIG. 1, the units of packaged goods are separated as indicated by the directional arrows. This includes the movement of the units of packaged goods 4 such that a maneuvering distance is created between them. This movement depends on many factors, including here the position of the units of packaged goods 4 during preparation on the conveyor table 3, their dimensions and the later movement to the target position or their target orientation. Step c shows the units of packaged goods 4 being individually rotated, wherein only those that are required to form the later target layer 5 in a different orientation are rotated. In the example shown, the number of units of packaged goods 4 of the original layer 1 is larger than the number of units of packaged goods 4 of the target layer 5. Specifically, 4 units of packaged goods 4 of the original layer 1 are not transferred to the target layer 5, whereas 8 units of packaged goods 4 of the original layer 1 later form the target layer 5. In step d of FIG. 1, the units of packaged goods 4 are moved translationally. The corresponding units of packaged goods 4 are brought together in this way in order to minimize the distances of the units 4 from one another within the target layer 5 and thus form the target layer 5. Moreover, the superfluous units of packaged goods 4 of the original layer 1 are moved to the edge of the conveyor table 3 in order to facilitate the subsequent removal of the target layer 5 from the conveyor table 3. In step e of FIG. 1, the formed target layer 5 is removed from the conveyor table 3 and loaded onto the target pallet 6. The superfluous units of packaged goods 4 of the original layer 1 remain on the conveyor table 3 and can, for example, be moved in a next step in such a way that they do not hinder the provision of a new original layer 1. For example, the units of packaged goods 4 can also be moved first to a target position of a new target layer 5. In the embodiment shown of the present invention, all units of packaged goods of the later target layer 5 thus remain on the conveyor table until the target layer 5 is complete or is removed. The movement distances covered by the units of packaged goods 4 are very short in comparison to previously known methods and the space required to carry out repalletizing is very low. A considerable amount of time can also be saved as a result of the very short distances of movement from the provision of the original layer 1 to reaching the respective position in the target layer 5.

Figure 2:
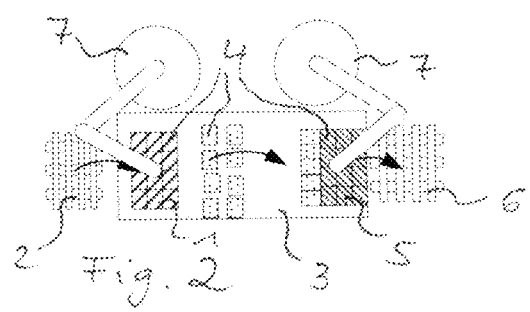
FIG. 2 shows a schematic diagram of successive method steps in a further preferred embodiment of the invention.

FIG. 2 shows a further preferred embodiment of the method according to the invention in a sketch-like schematic diagram. Units of packaged goods 4 from a total of three different original layers 1, respectively represented by different hatching, are on a conveyor table 3. A robot 7 respectively grips one original layer 1 and places it on the conveyor table 3. Following a separation movement, the units of packaged goods 4 are moved translationally in the direction of the target layer position. In the embodiment shown, the target layer 5 has a larger number of units of packaged goods 4 than an original layer 1. The units of packaged goods 4 required to complete the target layer 5 are thus added to the target layer 5 from a further original layer 1 by corresponding separation and addition. A second robot removes the target layer 5 from the conveyor table 3 after completion and possible condensing and places it on a target pallet 6.

In the intervening period or even after removal of the first target layer 5, a further third original layer 1 can be provided on the conveyor table 3. In a next step, the remaining units of packaged goods 4 of the second original layer 1 can be moved to the target layer position. In a continuation of the method with separation and movement to the predetermined position, the second target layer 5 can be prepared for removal from the conveyor table 3 with the units of packaged goods 4, which are required to complete the second target layer 5, from the third original layer 1. Also in this embodiment shown of the present invention, all units of packaged goods 4 of the later target layer 5 thus remain on the conveyor table until the target layer 5 is complete or is removed. The movement distances covered by the units of packaged goods 4 are very short in comparison to previously known methods and the space required to carry out repalletizing is very low. A considerable amount of time can also be saved as a result of the very short distances of movement from the provision of the original layer 1 to reaching the respective position in the target layer 5.

Figure 3:
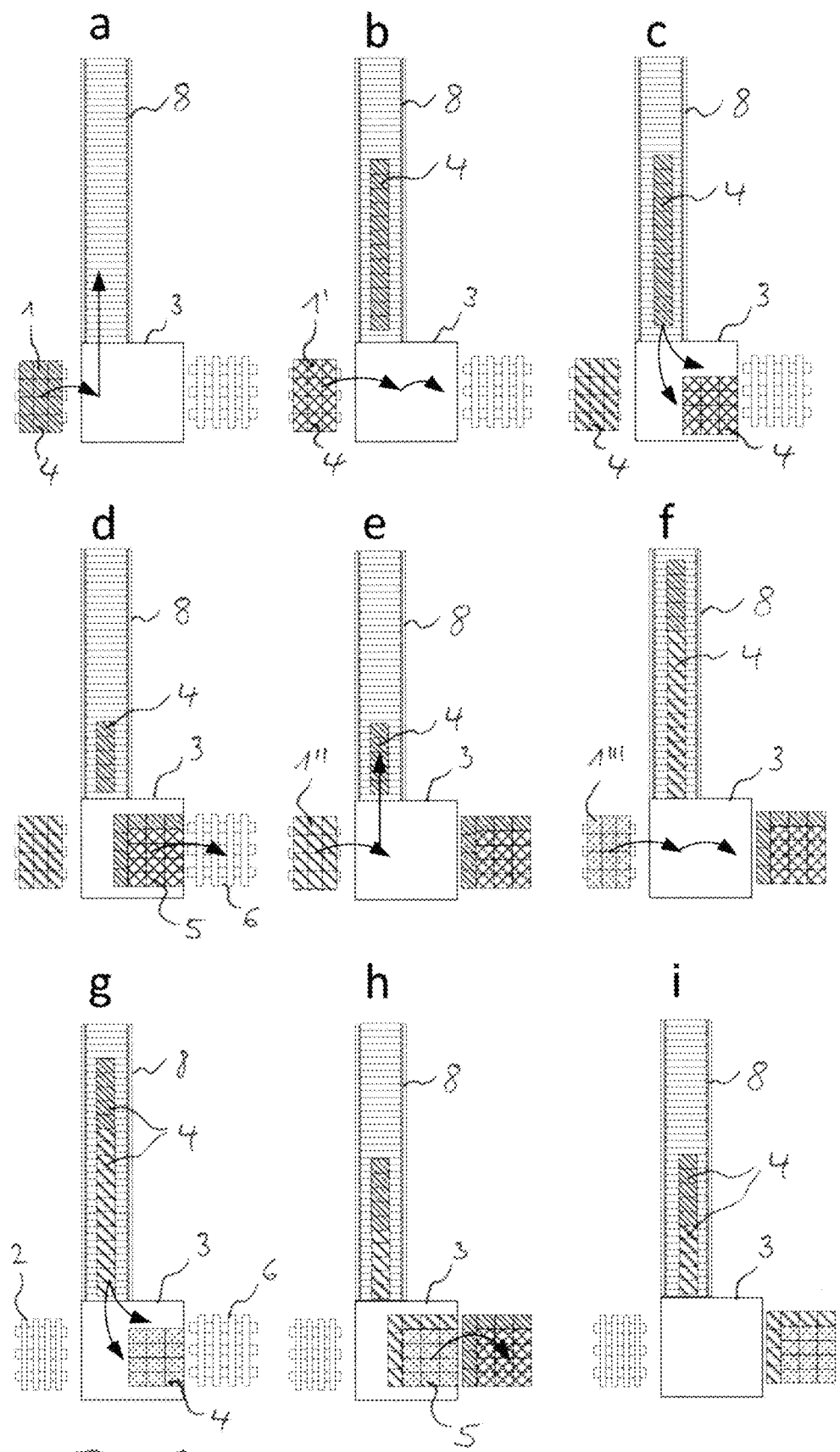
FIG. 3 shows a schematic diagram of successive method steps in a further preferred embodiment of the invention.

FIG. 3 shows a further preferred embodiment of the method according to the invention in a schematic diagram. In step a, a first original layer 1 is firstly moved by the conveyor table 3 to a buffer section 8 in the form of a roller conveyor. In step b, a second original layer 1' is placed on the conveyor table 3 and the units of packaged goods 4 of the second original layer 1' are moved to their corresponding positions of the target layer 5. From the buffer section of the roller conveyor 8, units of packaged goods 4 of the first original layer 1 are placed on the conveyor table 3 in step c and moved in such a manner that, as shown in step d, they complete the target layer 5, which also has a larger number of units of packaged goods 4 in this embodiment than the original layer 1. The target layer 5 produced in this way is moved onto a target pallet 6 in step d. In step e, in a continuation of the method, a new original layer 1" can be placed on the conveyor table 3 and moved to a buffer section 8 by means of the conveyor devices of the conveyor table 3. In step f, a fourth original layer 1'" can be placed on the conveyor table 3, as the second original layer 1' already has been in step b, and the units of packaged goods of this original layer 1'" can be moved to their respective position of the target layer 5. In basic repetition of step c, a completion of the target layer 5 is in turn achieved in step g by moving the units of packaged goods 4 of the buffered units of packaged goods onto the conveyor table 3 and into the corresponding position of the target layer 5. The second complete target layer 5 can be placed onto the first target layer 5 of the target pallet 6 in step h. In step i, the remaining units of packaged goods 4 can, for example, be moved out of the buffer section 8 in a final step. They can either be removed as superfluous or combined to form a final target layer 5. In this embodiment of the method according to the invention, the units of packaged goods 4 of the second original layer 1' remain on the conveyor table 3. Even if in this embodiment the units of packaged goods 4 of the first original layer 1 are initially moved to a buffer section 8 in order to be later placed on the conveyor table 3 again to complete the target layer 5, the central idea of the method according to the invention and the associated advantages are nevertheless very well achieved and realized.

Figure 4:
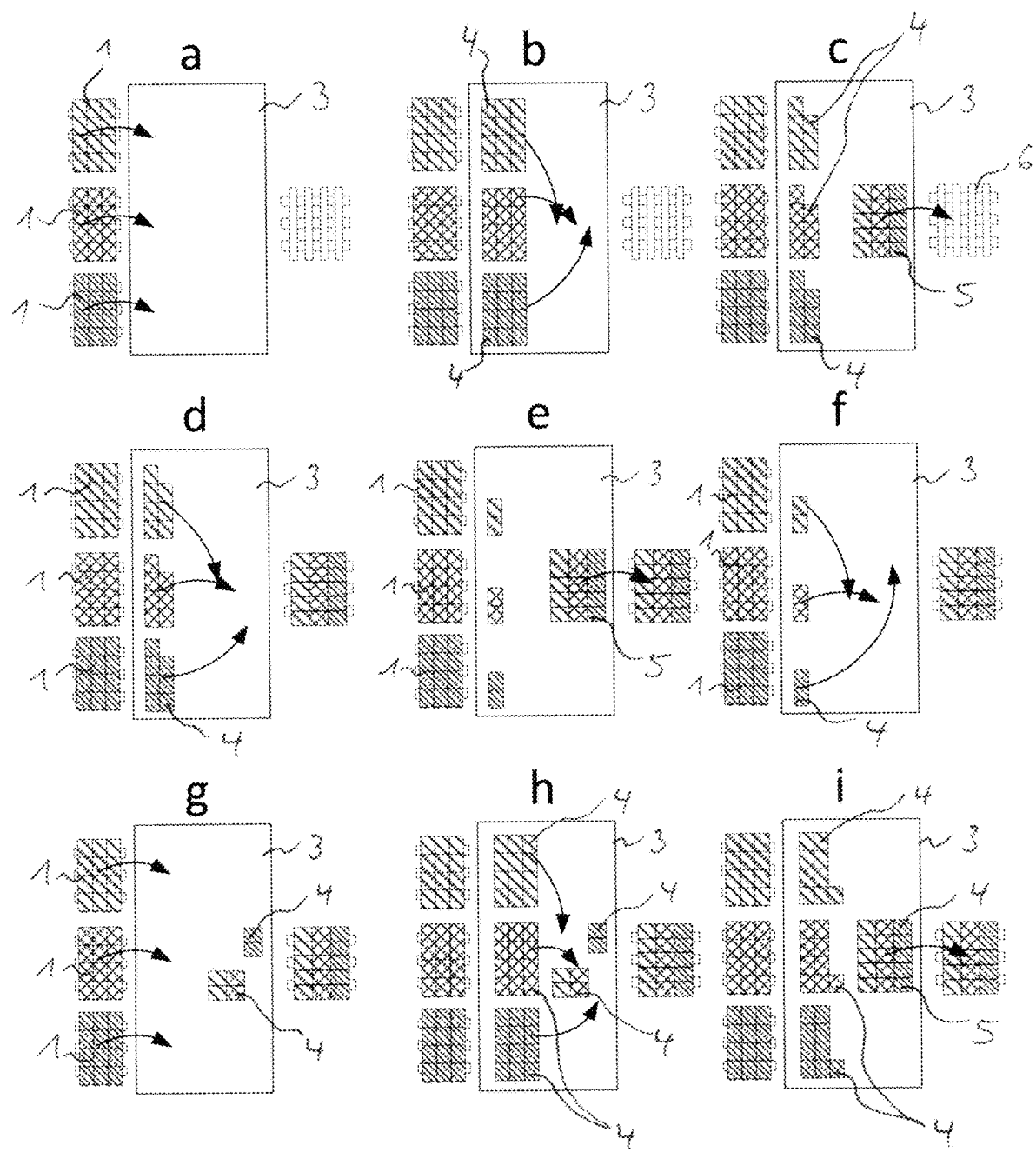
FIG. 4 shows a schematic diagram of successive method steps in a further preferred embodiment of the invention.

FIG. 4 shows a sketch-like schematic diagram of a further preferred embodiment of the method according to the invention. In step a, three original layers 1 are placed simultaneously or one after the other on the conveyor table 3. For the sake of clarity, the units of packaged goods 4 of the respective original layer 1 are hatched differently than the units of packaged goods 4 of another original layer 1 according to which original layer they belong to. In step b, those units of packaged goods 4 that should belong to the target layer 5 are respectively separated in rotation and/or translation from the original layer 1. According to the purely schematic directional arrows, the separated units of packaged goods 4 are moved to their target position in order to form the target layer 5 in the next step c. A condensing movement possibly follows in step c, before the target layer 5 can be removed from the conveyor table 3 and can be placed onto the target pallet 6. In step d, further units of packaged goods 4 from each of the three original layers 1 remaining up to now in their original position are initially separated from the original layer 1 almost in a repetition of step b and then moved to their respective target position of the target layer 5, as indicated in simplified form by the directional arrows. In step e, the target layer 5 is possibly condensed and removed from the conveyor table. It can be placed onto the first target layer 5 on the target pallet 6, or else onto a new target pallet 6. In step f, the remaining units of packaged goods 4 of the three original layers 1 are separated and moved to their target position in the target layer 5. However, as the third target layer 5 thus cannot be completely formed, three new original layers 1 are placed on the conveyor table 3 in step g. In basic repetition of step b, the units of packaged goods 4, which are required to complete the third target layer 5, are separated in step h from the respective new original layer 1 and moved into their target position to the target layer 5. In this case, both rotations and translations can in turn be performed by the conveyor table 3. The movements are schematically indicated by the directional arrows. In step i, the possibly condensed third target layer 5 is removed from the conveyor table and placed on the target pallet 6, possibly onto the first or second previously produced target layer 5. In this embodiment of the invention, all of the units of packaged goods 4 of the respective target layers 5 likewise remain on the conveyor table 3 during the entire process. The conveyor table is designed to be larger than in the previously shown embodiments in order to accommodate a plurality of different original layers 1. Nevertheless, very space-intensive buffer sections as would be necessary in the previously known methods of the prior art are eliminated. In the embodiment presented here, even complex layer patterns of the target layer are realized in a very small amount of space and in a very short time frame.

Figure 5:
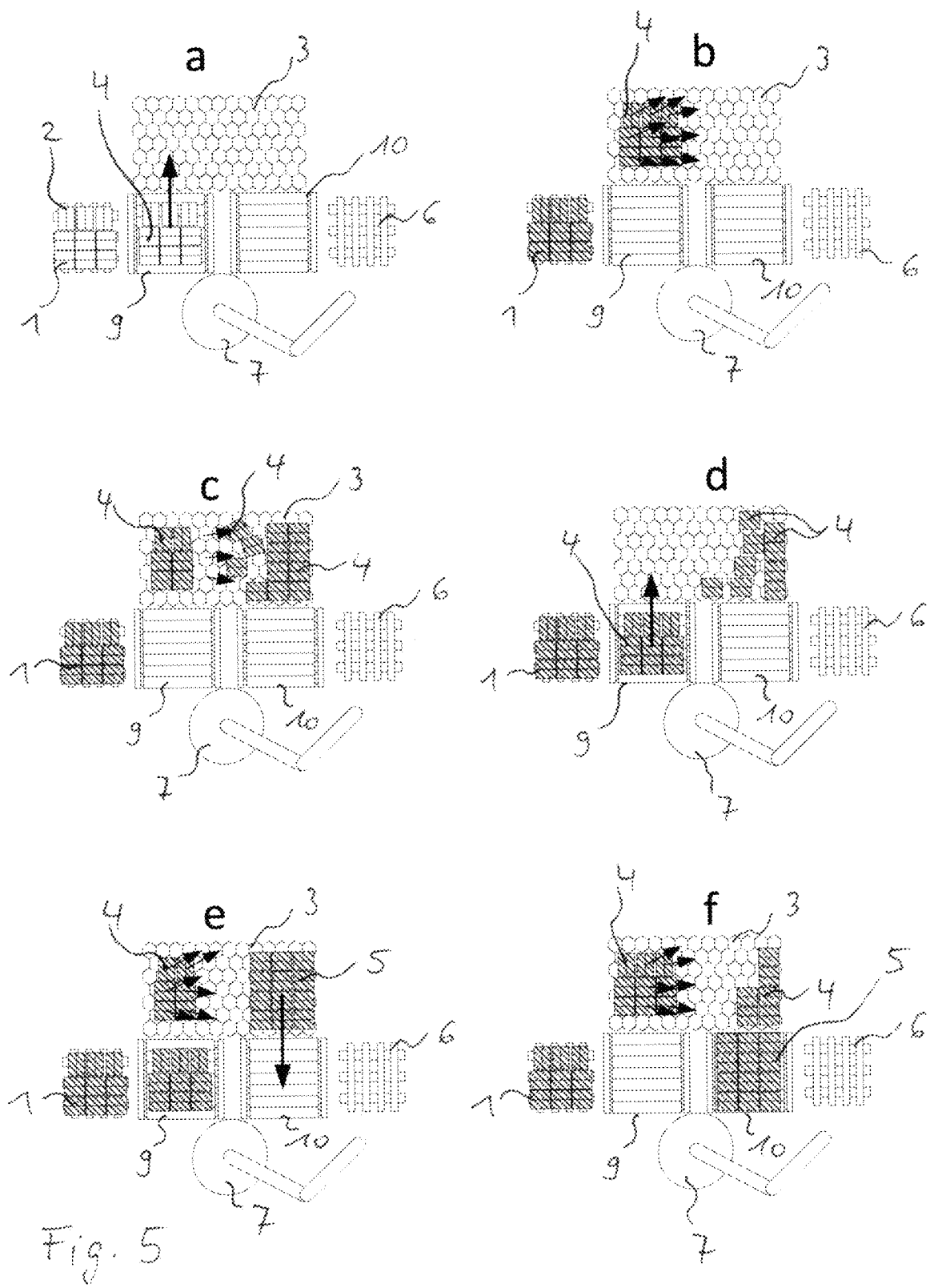
FIG. 5 shows a schematic diagram of successive method steps in a further preferred embodiment of the invention.

FIG. 5 shows a schematic diagram of a further preferred embodiment of the method according to the invention. In step a, an original layer 1 is initially loaded onto an input roller conveyor 9. The roller conveyor 9 places the original layer 1 on the conveyor table 3. In this embodiment, the original layer 1 provided does not comprise all the units of packaged goods of a layer of an original pallet 2. In this embodiment, the original layer 1 instead comprises a row of a layer of the original pallet 2 and is correspondingly placed row-by-row, as it were, on the conveyor table 3. The original pallet 2 can be loaded onto the input roller conveyor 9 in an automated manner, for example, by a robot 7. In step b, the units of packaged goods 4 of the original layers 1 are separated on the conveyor table 3. In step c, the units of packaged goods 4 are then moved to their target position of the target layer 5. In the embodiment shown here, this can be carried out both simultaneously and sequentially, for example respectively 2 units of packaged goods 4 at the same time, or else row-by-row in orientation to the target layer. Step d indicates that it is also possible to provide a further original layer 1 from the input roller conveyor 9 on the conveyor table whilst the units of packaged goods 4 of the first original layer are still not in their final position of the target layer 5. In step e, the target layer 5 is completed and possibly condensed and delivered to an output roller conveyor 10 by the conveyor table 3. From the output roller conveyor 10, the target layer 5 can, for example, be removed by the robot 7 and placed onto a target pallet 6. At the same time as or before or after the first target layer 5 is transferred to the output roller conveyor 10, further units of packaged goods 4 can be separated from the second original layer 1 from step d provided on the conveyor table 3. In addition, such units of packaged goods 4 can also be moved in the direction of their target position in the new target layer 5 to be formed. In step f, the provision of new original layers 1, the separation of the newly provided units of packaged goods 4 and their movement into the respective target positions to form and complete the target layer 5 can be continued. In this embodiment of the method according to the invention, almost continuous repalletizing can be performed and can be carried out not only "batch-wise" but "in flow". It is particularly advantageous in this case that both the space requirement of the embodiment as well as the time required for repalletizing are minimal. It should also be stressed that a high degree of variability in terms of upstream or downstream steps is also enabled by combining the movements carried out by the roller conveyors 9, 10 with the movements according to the invention on the conveyor table 3. For example, the robot 7 can thus be placed at a suitable location in the warehouse, the target pallet 6 can be transferred directly to a wrapping station etc. The spaces and paths required for this purpose can be adapted by means of inexpensive and reliable roller conveyors without limiting or losing the advantages of the method according to the invention.

REFERENCE LIST

1 Original layer, also 1', 1", 1'''
2 Original pallet
3 Conveyor table
4 Unit of packaged goods
5 Target layer
6 Target pallet
7 Robot
8 Buffer section
9 Input roller conveyor
10 Output roller conveyor

The invention claimed is:

1. A method for automated repalletizing of packaged goods using a conveyor table, wherein the conveyor table includes devices for the omnidirectional movement of units of packaged goods from an original layer to a target layer, wherein the conveyor table has an area that is larger than an area that is occupied by the original layer of the units of packaged goods, the method comprising:
    transferring the original layer of the units of packaged goods from an original pallet to the conveyor table;
    automatically separating, by the conveyor table, the units of packaged goods in the original layer such that maneuvering distances are created between at least two of the units of packaged goods;
    moving, subsequent to separating the units of packaged goods, the units of packaged goods to a predetermined position on the conveyor table that is associated with the target layer; and
    completing and compressing the units of packaged goods at the predetermined position to form the target layer that is ready for placement on a target pallet, wherein the units of packaged goods in the target layer have a different configuration than the units of packaged goods in the original layer, and
    wherein more than one of the units of packaged goods moved from the original layer to the target layer remain on the conveyor table during the automatically separating, moving, and completing and compressing.

2. The method according to claim 1, wherein the different configuration relates to a number of the units of packaged goods and/or a layer pattern of the original layer being different from a number of the units of packaged goods and/or a layer pattern of the target layer.

3. The method according to claim 1, wherein at least one unit of packaged goods is both moved translationally and rotated.

4. The method according to claim 3, wherein the at least one unit of packaged goods is both moved translationally and rotated simultaneously in sections.

5. The method according to claim 1, wherein at least two units of packaged goods are moved in mutually different translatory directions or in different directions of rotation.

6. The method according to claim 1, wherein both the units of packaged goods of the original layer and the units of packaged goods of the target layer are on the conveyor table during the automatically separating, moving, and completing and compressing.

7. The method according to claim 1, wherein the area of the conveyor table is between 1.2 times and 5.0 times larger than the area that is occupied by the original layer of the units of packaged goods.

8. The method according to claim 1, wherein the area of the conveyor table is larger than an area of the target layer of the units of packaged goods.

9. The method according to claim 1, wherein the devices for the omnidirectional movement of packaged goods have wheels, wherein either each wheel can be driven individually or a plurality of wheels can be driven by a common drive.

10. A device comprising:

a memory; and a processor that executes instructions stored on theft memory to perform a method for automated repalletizing of packaged goods using a conveyor table, wherein the conveyor table includes devices for the omnidirectional movement of units of packaged goods from an original layer to a target layer, wherein the conveyor table has an area that is larger than an area that is occupied by the original layer of the units of packaged goods, the method comprising:

transferring the original layer of the units of packaged goods from an original pallet to the conveyor table;

automatically separating, by the conveyor table, the units of packaged goods in the original layer such that maneuvering distances are created between at least two of the units of packaged goods;

moving, subsequent to separating the units of packaged goods, the units of packaged goods to a predetermined position on the conveyor table that is associated with the target layer; and completing and compressing the units of packaged goods at the predetermined position to form the target layer that is ready for placement on a target pallet, wherein the units of packaged goods in the target layer have a different configuration than the units of packaged goods in the original layer, and wherein more than one of the units of packaged goods moved from the original layer to the target layer remain on the conveyor table during the automatically separating, moving, and completing and compressing.

11. A non-transitory computer readable memory including control instructions that, when executed by a processor, cause the processor to perform a method for automated repalletizing of packaged goods using a conveyor table, wherein the conveyor table includes devices for the omnidirectional movement of units of packaged goods from an original layer to a target layer, wherein the conveyor table has an area that is larger than an area that is occupied by the original layer of the units of packaged goods, the method comprising:

transferring the original layer of the units of packaged goods from an original pallet to the conveyor table;

automatically separating, by the conveyor table, the units of packaged goods in the original layer such that maneuvering distances are created between at least two of the units of packaged goods;

moving, subsequent to separating the units of packaged goods, the units of packaged goods to a predetermined position on the conveyor table that is associated with the target layer; and completing and compressing the units of packaged goods at the predetermined position to form the target layer that is ready for placement on a target pallet, wherein the units of packaged goods in the target layer have a different configuration than the units of packaged goods in the original layer, and wherein more than one of the units of packaged goods moved from the original layer to the target layer remain on the conveyor table during the automatically separating, moving, and completing and compressing.

\* \* \* \* \*